US012479882B2

(12) United States Patent
Hsu et al.

(10) Patent No.: US 12,479,882 B2
(45) Date of Patent: Nov. 25, 2025

(54) PREPARATION METHOD OF SETMELANOTIDE BY CYCLIZATION OF DISULFIDE BOND IN SOLID PHASE

(71) Applicant: Chunghwa Chemical Synthesis & Biotech Co. Ltd., New Taipei (TW)

(72) Inventors: Yao-Lung Hsu, New Taipei (TW); Chun-I Lee, New Taipei (TW); Chun-Ling Lin, New Taipei (TW); Ya-Ling Huang, New Taipei (TW); Jia-Chun Lee, New Taipei (TW)

(73) Assignee: CHUNGHWA CHEMICAL SYNTHESIS & BIOTECH CO. LTD., New Taipei (TW)

( * ) Notice: Subject to any disclaimer, the term of this patent is extended or adjusted under 35 U.S.C. 154(b) by 280 days.

(21) Appl. No.: 18/312,203

(22) Filed: May 4, 2023

(65) Prior Publication Data

US 2024/0199685 A1 Jun. 20, 2024

(30) Foreign Application Priority Data

Dec. 15, 2022 (TW) .................. 111148202

(51) Int. Cl.
*C07K 7/00* (2006.01)
*C07K 1/06* (2006.01)
*C07K 1/107* (2006.01)
*C07K 7/54* (2006.01)

(52) U.S. Cl.
CPC .............. *C07K 1/061* (2013.01); *C07K 1/107* (2013.01); *C07K 7/54* (2013.01)

(58) Field of Classification Search
CPC ........... C07K 1/061; C07K 1/107; C07K 7/05
See application file for complete search history.

(56) References Cited

U.S. PATENT DOCUMENTS

2012/0226018 A1 9/2012 Dong

FOREIGN PATENT DOCUMENTS

CN 111718408 A 9/2000

OTHER PUBLICATIONS

Thieriet et al. Organic Letters, 2000, vol. 2, No. 13, 1815-1817.*

* cited by examiner

*Primary Examiner* — Jeanette M Lieb
(74) *Attorney, Agent, or Firm* — MUNCY, GEISSLER, OLDS & LOWE, P.C.

(57) ABSTRACT

The present disclosure provides a preparation method of setmelanotide by cyclization of a disulfide bond in a solid phase. By using different solvents or mixed solvents to carry out a cyclization reaction in a solid phase, the reaction concentration can be greatly increased in comparison with a cyclization reaction in a liquid phase, and the production of impurities can also be reduced, so that the effects of reducing the use of the solvents and increasing the production capacity are achieved.

13 Claims, No Drawings

PREPARATION METHOD OF SETMELANOTIDE BY CYCLIZATION OF DISULFIDE BOND IN SOLID PHASE

FIELD OF TECHNOLOGY

The present disclosure relates to a preparation method of setmelanotide by cyclization of a disulfide bond in a solid phase.

BACKGROUND

Setmelanotide is an analogue of melanocortin. The melanocortin belongs to regulatory peptides, and a receptor thereof has also been used as a target for treatment of LEPR-deficient obesity. According to research results, it is indicated that the problems of overeating and obesity caused by the LEPR-deficient obesity can be reduced by using the setmelanotide.

The setmelanotide has the following structure:
Ac-Arg-c(Cys-D-Ala-His-D-Phe-Arg-Trp-Cys)-NH2, in which a disulfide bond is formed by two Cys and then subjected to cyclization.

At present, only a few patent reports have been conducted on methods for preparing the setmelanotide. According to the patent US20120226018A1, preparation is conducted by solution-phase peptide synthesis. However, the method has complicated steps and a large reaction volume, so that large-scale production is not facilitated.

Meanwhile, according to another patent CN111718408A, a solid-phase synthesis method is used. However, according to the method, a disulfide bond is still formed in a solution phase in a last step, and the reaction concentration of a peptide is required to be 3 mg/ml, so that large-scale production is also not facilitated.

SUMMARY

As mentioned in the prior art, in the CN111718408A, although solid-phase synthesis is used, cyclization is carried out in a solution phase after cleavage. During the cyclization in the solution phase, the reaction concentration of a peptide is required to be extremely low (such as 3 mg/ml), otherwise a lot of impurities are produced. Therefore, it is found by the inventor of this application that even when the method in the CN111718408A is used, an extremely high amount of a liquid is required in a last solution phase, so that large-scale industrial production is not facilitated.

In view of the above, in order to solve the above problems, one objective of the present invention is to provide a preparation method of setmelanotide by cyclization of a disulfide bond in a solid phase, comprising: preparation of a peptide resin without cyclization of a setmelanotide protective group: using an amino resin as an initial resin first, and then sequentially connecting amino acids with a protective group in a reverse direction according to an amino acid sequence of setmelanotide to obtain the peptide resin without cyclization of a setmelanotide protective group; and cyclization of a disulfide bond of the peptide resin without cyclization of a setmelanotide protective group: putting the peptide resin without cyclization of a setmelanotide protective group in a reaction solvent containing an oxidizing agent, adding a reducing agent to remove the unreacted oxidizing agent, adding a cleavage reagent to obtain a cyclized setmelanotide solution, and finally, dropping the cyclized setmelanotide solution into an ether for precipitation to obtain crude setmelanotide, or adding the cyclized setmelanotide solution into a dilution solution to obtain a crude setmelanotide solution. According to one or more embodiment of the present invention, the dilution solution comprises water, an alkaline aqueous solution, a mixed solution of water and an alcohol, or a mixed solution of water and acetonitrile.

Further, the said preparation method further comprises subjecting the crude setmelanotide or the crude setmelanotide solution to purification and freeze-drying to obtain pure setmelanotide.

Further, in the said preparation method, the peptide resin without cyclization of a setmelanotide protective group is
Ac-Arg(Pbf)-Cys(R1)-D-Ala-His(Trt)-D-Phe-Arg(Pbf)-Trp(R2)-Cys(R1)-NH amino resin, R1 is Trt or Acm, and R2 is Boc or H.

Further, in the said preparation method, the amino resin comprises a Rink Amide-MBHA resin, a Rink Amide-BHA resin, a Rink Amide-AM resin, or a Rink Amide resin.

Further, in the said preparation method, the peptide resin without cyclization of a setmelanotide protective group has a substitution value of 0.1 to 0.8 mmol/g, preferably 0.15 to 0.62 mmol/g.

Further, in the said preparation method, the reaction solvent comprises nitriles, alcohols, alkanones or cycloethers, and other solvents or mixed solvents.

Further, in the said preparation method, the reaction solvent is a mixed solvent of N-methylpyrrolidone and tetrahydrofuran at a volume ratio of 3:1 to 1:3.

Further, in the said preparation method, the oxidizing agent is iodine.

Further, in the said preparation method, a molar ratio of the use amount of the iodine to the resin is 4 to 12 times.

Further, in the said preparation method, the reducing agent is vitamin C.

Further, in the said preparation method, a molar ratio of the vitamin C to the iodine is 5 to 10 times.

As mentioned above, compared with known technologies including synthesis of setmelanotide in a solution phase, or including synthesis of setmelanotide in a solid phase, followed by cleavage and then cyclization in a solution phase, the present disclosure includes synthesizing setmelanotide in a solid phase, and forming a disulfide bond still in a solid phase, followed by cyclization and cleavage at last. Therefore, the use of a solvent can be reduced, and the production capacity of the setmelanotide can be increased.

Therefore, the present disclosure provides a preparation method of setmelanotide by cyclization of a disulfide bond in a solid phase, so that the setmelanotide can be applied to the pharmaceutical industry.

Other features and advantages of the present invention will be apparent from the specific embodiment and the claims. Accordingly, other aspects of the invention are described by the following disclosure, and such aspects are within the scope of the invention. Intermediate compounds also form part of the invention disclosed herein.

BRIEF DESCRIPTION OF THE DRAWINGS

None.

DESCRIPTION OF THE EMBODIMENTS

As used herein, the term "comprise or include" means that in addition to the described components, steps, operational instructions and/or elements, it does not exclude the presence of one or more other components, steps, operational instructions and/or or additional elements. The term "a"

means that the grammatical object of the article is one or more than one (eg: at least one). The term "a" and "the" are used interchangeably herein.

Unless terms used herein otherwise defined, all scientific and technical terms used herein have the meanings commonly understood by those skilled in the art.

The present disclosure provides a preparation method of setmelanotide by cyclization of a disulfide bond in a solid phase. The method includes: preparation of a peptide resin without cyclization of a setmelanotide protective group: using an amino resin as an initial resin first, and then sequentially connecting amino acids with a protective group in a reverse direction according to an amino acid sequence of setmelanotide to obtain the peptide resin without cyclization of a setmelanotide protective group; and cyclization of a disulfide bond of the peptide resin without cyclization of a setmelanotide protective group: putting the peptide resin without cyclization of a setmelanotide protective group in a reaction solvent containing an oxidizing agent, adding a reducing agent to remove the unreacted oxidizing agent, adding a cleavage reagent to obtain a cyclized setmelanotide solution, and finally, dropping the cyclized setmelanotide solution into an ether for precipitation to obtain crude setmelanotide, or adding the cyclized setmelanotide solution into a dilution solution to obtain a crude setmelanotide solution.

Compared with the situation in the prior art that the setmelanotide is subjected to cleavage on a peptide resin without cyclization of a setmelanotide protective group and then subjected to cyclization in a liquid phase with an oxidizing agent (namely, cleavage first and then cyclization in a liquid phase), the term "cyclization of a disulfide bond in a solid phase" used herein indicates that the setmelanotide is subjected to cyclization on a peptide resin without cyclization of a setmelanotide protective group (solid phase) by contacting the resin with an oxidizing agent in a solvent, and then a cleavage reagent is added to cut a product from the resin so as to collect a product solution (namely cyclization in a solid phase first and then cleavage). In a preferred embodiment, the cyclization of a disulfide bond in a solid phase includes stirring a resin and an oxidizing agent in a solvent for several hours, adding a reducing agent to remove the unreacted oxidizing agent, and finally cleaning the resin with different solvents. After the resin is completely cleaned, most of a solution is removed, and a cleavage reagent is added for cutting a product from the resin so as to collect a product solution.

As used herein, the term "resin" or "solid phase resin" refers to any type of carrier applicable to solid-phase peptide synthesis, and may be prepared from one or more of polymers and copolymers or combinations of polymers (such as polyamide, polysulfonamide, substituted polyethylene, polyethylene glycol, phenol resins, polysaccharides or polystyrene). The solid phase resin preferably includes, but is not limited to the following resins: Rink Amide-MBHA resin, Rink Amide-BHA resin, Rink Amide-AM resin, or Rink Amide resin.

As used herein, the term "oxidizing agent" refers to a substance capable of achieving an oxidation reaction of two Cys amino acids with an —SH group in the setmelanotide to form an —S—S— disulfide bond. An available oxidizing agent includes an acidic oxidizing agent (such as hydrogen peroxide, peracetic acid, sodium dichromate, chromic acid, potassium permanganate, and ammonium persulfate), an alkaline oxidizing agent (such as sodium hypochlorite, sodium percarbonate, sodium perborate, and potassium perborate), or a neutral oxidizing agent (such as bromine and iodine). In an embodiment of the present disclosure, the oxidizing agent is iodine, but is not limited thereto.

As used herein, the term "reducing agent" refers to a substance capable of reducing or preventing further action of the above oxidizing agent, and may include a water-soluble antioxidant (such as ascorbic acid, isoascorbic acid and a salt thereof, phytic acid, disodium ethylenediamine tetraacetic acid, amino acid, peptides, and sugar alcohols) or a fat-soluble antioxidant (such as butylhydroxyanisole (BHA), dibutylhydroxytoluene (BHT), propyl gallate (PG), tert-butylhydroquinone (TBHQ), and a tocopherol mixture). In an embodiment of the present disclosure, the ascorbic acid is vitamin C, but is not limited thereto.

As used herein, the term "cleavage reagent" refers to a substance capable of cutting a peptide obtained after solid-phase synthesis from a solid phase material of a resin, and also capable of removing a protective group from the peptide at the same time. An acidolysis reagent for holistic de-protection usually includes trifluoroacetic acid (TFA), HCl, Lewis acid, liquid hydrofluoric acid (HF), hydrogen bromide (HBr), trifluoromethanesulfonic acid, or a combination thereof. A de-protective solution also includes one or more of appropriate cationic purifiers, such as dithiothreitol (DTT), anisole, p-cresol, ethanedithiol, or methyl sulfide. The de-protective solution may also include water. In an embodiment of the present disclosure, the cleavage reagent includes, but is not limited to, a mixture of trifluoroacetic acid (TFA), triisopropylsilicane (TIPS) and methylene chloride (MC).

As used herein, the term "reaction solvent" refers to a solvent that is used for soaking the resin and is capable of dissolving the oxidizing agent and/or the reducing agent, and may be at least one selected from nitriles, alcohols, alkanones or cycloethers, and other solvents or mixtures thereof, such as acetonitrile, methanol, N-methylpyrrolidone, or tetrahydrofuran. In an embodiment of the present disclosure, the solvent is a mixture of N-methylpyrrolidone and tetrahydrofuran. It is found by the inventor through an experiment that when a mixed solvent system is used, the recovery rate of the setmelanotide can be improved.

As used herein, the term "purification" refers to a process of separating the setmelanotide from a crude product to obtain a pure product, and may include a filtration method, a distillation method, a crystallization method, a sublimation method, an extraction method, or a chromatography method. In an embodiment of the present disclosure, high performance liquid chromatography (HPLC) is used.

In an embodiment of the present disclosure, Chinese meanings corresponding to English abbreviations used are as shown in the following table:

| English abbreviation | Chinese name | English abbreviation | Chinese name |
| --- | --- | --- | --- |
| Fmoc | 9-fluorenyl methoxycarbonyl | Cys | Cysteine |
| Trt | Triphenylmethyl | Trp | Tryptophan |
| Boc | Tert-butoxycarbonyl | Arg | Arginine |
| Pbf | 2,2,4,6,7-pentamethyldihydrobenzofuran-5-sulfonyl | Phe | Phenylalanine |
| His | Histidine | Ala | Alanine |

In an embodiment of the present disclosure, the peptide resin without cyclization of a setmelanotide protective group has a substitution value of 0.1 to 0.8 mmol/g, such as 0.1 to 0.2 mmol/g, 0.2 to 0.3 mmol/g, 0.3 to 0.4 mmol/g, 0.4 to 0.5 mmol/g, or 0.5 to 0.62 mmol/g. In a more preferred embodiment, the peptide resin without cyclization of a setmelanotide protective group has a substitution value of 0.2 to 0.22 mmol/g, 0.22 to 0.24 mmol/g, 0.24 to 0.26 mmol/g, or 0.26 to 0.28 mmol/g.

In an embodiment of the present disclosure, a reaction may be carried out at a preferred temperature. In a preferred embodiment, the reaction is carried out at a temperature of −5° C. to 12.5° C., such as −5° C. to −2.5° C., −2.5° C. to 0° C., 2.5° C. to 5° C., 5° C. to 7.5° C., 7.5° C. to 10° C. or 10° C. to 12.5° C. In a more preferred embodiment, the reaction is carried out at a temperature of 2.5° C. to 5° C., such as 2.5° C., 3° C., 3.5° C., 4° C., 4.5° C., or 5° C.

In an embodiment of the present disclosure, a reaction may be carried out for a preferred time, such as, but not limited to, 1 to 24 hours, such as 1 to 4 hours, 4 to 8 hours, 8 to 12 hours, 12 to 16 hours, 16 to 20 hours or 20 to 24 hours. In a more preferred embodiment, the reaction time is 1 to 4 hours, such as 1 hour, 2 hours, 3 hours or 4 hours, most preferably 3 hours.

In an embodiment of the present disclosure, a preferred molar ratio of an equivalent ratio of the resin oxidizing agent to the resin is 4 to 12 times, such as 4 to 6 times, 6 to 8 times, 8 to 10 times or 10 to 12 times. In a more preferred embodiment, the molar ratio of the equivalent ratio of the oxidizing agent to the resin is 8 to 10 times, such as 8 times, 9 times or 10 times.

In an embodiment of the present disclosure, a molar ratio of the reducing agent to the oxidizing agent is 5 to 25 times, such as 5 to 10 times, 10 to 15 times, 15 to 20 times, or 20 to 25 times. In a more preferred embodiment, a molar ratio of the reducing agent to the oxidizing agent is 5 to 10 times, such as 5 times, 6 times, 7 times, 8 times, 9 times or 10 times.

In an embodiment of the present disclosure, a molar ratio of the use volume of the reaction solvent to the resin is 20 to 90 times, such as 20 to 30 times, 30 to 40 times, 40 to 50 times, 50 to 60 times, 60 to 70 times, 70 to 80 times or 80 to 90 times. In a more preferred embodiment, a molar ratio of the reaction solvent to the resin is 40 to 50 times, such as 41 times, 42 times, 43 times, 44 times, 45 times, 46 times, 47 times, 48 times, 49 times or 50 times.

In an embodiment of the present disclosure, a preferred reaction solvent including N-methylpyrrolidone and tetrahydrofuran may be used at a preferred mixing volume ratio. In a preferred embodiment, the mixed solvent of N-methylpyrrolidone and tetrahydrofuran at a volume ratio of 3:1 to 1:3, such as 1:1, 1:2, 1:3, 2:1, 2:2, 2:3, 3:1, 3:2 or 3:3. In a more preferred embodiment, the mixed solvent of N-methylpyrrolidone and tetrahydrofuran at a volume ratio of 1:1.

According to a solid-phase peptide synthesis method, after appropriate post-treatment (including, but not limited to, ether precipitation or dilution with a dilution solution), further purification and drying of a peptide are conducted, and then combination with other components, freeze-drying, encapsulation, storage, further treatment and/or treatment by other methods are conducted as required. The method can be realized in any appropriate way.

The present invention will be described in more detail with exemplary embodiments below. While exemplary embodiments are disclosed herein, it should be understood that they are used to illustrate the invention and not to limit the scope of the invention.

Example 1—Preparation Method of a Peptide Resin without Cyclization of a Setmelanotide Protective Group A preparation method of a peptide resin without cyclization of a setmelanotide protective group of the present disclosure includes based on a solid-phase peptide synthesis method, using an amino resin with an Fmoc protective group as an initial resin, and then conducting sequential coupling in a reverse direction according to an amino acid sequence of setmelanotide to obtain the peptide resin without cyclization of a setmelanotide protective group. The preparation method is described in detail below:

First, 230 grams of an amino resin with an Fmoc protective group (Fmoc-Rink Amide AM Resin with a substitution value of 0.35 mmol/g) was weighed in a reaction tube, 3.315 kg of N-methylpyrrolidone was used as a solvent for soaking the resin, and the solvent was drained after stirring for 60 minutes.

Then, in the example, sequential coupling was conducted in a reverse direction according to an amino acid sequence of setmelanotide. The amino acid sequence of setmelanotide is as shown in the following table:

| Coupling sequence | Amino acid | Use amount |
|---|---|---|
| 1 | Fmoc-Cys(Trt)-OH | 93.71 grams |
| 2 | Fmoc-Trp(Boc)-OH | 84.25 grams |
| 3 | Fmoc-Arg(Pbf)-OH | 103.80 grams |
| 4 | Fmoc-D-Phe-OH | 61.99 grams |
| 5 | Fmoc-His(Trt)-OH | 99.15 grams |
| 6 | Fmoc-D-Ala-OH | 49.81 grams |
| 7 | Fmoc-Cys(Trt)-OH | 93.71 grams |
| 8 | Fmoc-Arg(Pbf)-OH | 103.80 grams |

The following 5 steps were repeated according to the above amino acid sequence:
1. 2.370 kg of N-methylpyrrolidone was added as a solvent for soaking the resin, and the solvent was drained after stirring for 10 minutes.
2. 1.580 kg of 20% piperidine/N-methylpyrrolidone (v/v) was added to a reaction tube for an Fmoc protective group removal reaction, and the solvent was drained after stirring for 10 minutes. The step was repeated for one time.
3. 2.370 kg of N-methylpyrrolidone was added for cleaning the resin, and the solvent was drained after stirring for 5 minutes. The step was repeated for three times.
4. An amino acid reaction solution was prepared. An amino acid (with reference to the above table) and 51.37 grams of TBTU were added into 2.370 kg of N-methylpyrrolidone, and stirred until complete dissolution. Then, 31.02 grams of DIEPA was added, stirred for 3 minutes, and added into a reaction tube for a reaction at a temperature of 20±5° C. The solution was drained after stirring for 50 minutes.
5. 2.370 kg of N-methylpyrrolidone was added for cleaning the resin, and the solvent was drained after stirring for 5 minutes. The step was repeated for three times.

After the above 5 steps were completed, 3.055 kg of methylene chloride was added for cleaning the resin, and the solvent was drained after stirring for 5 minutes. The step was repeated for one time. The resin was transferred from the reaction tube to a filter funnel with a filter paper laid, and then drained by vacuum filtration. At last, the setmelanotide resin was transferred to an iron plate, and put into a vacuum oven for drying at 25±5° C. to obtain a peptide resin without cyclization of a setmelanotide protective group.

Preparation Method of Setmelanotide by Cyclization of a Disulfide Bond in a Solid Phase In the following example 2 to example 7, a preparation method of setmelanotide by cyclization of a disulfide bond is provided.

Example 2 (N-Methylpyrrolidone as a Solvent)

2 mmol of the peptide resin without cyclization of a setmelanotide protective group prepared in Example 1 was suspended in 80 ml of an N-methylpyrrolidone solvent for soaking the resin, and the solvent was discharged after stirring for 10 minutes. 80 ml of an N-methylpyrrolidone solvent was added for soaking the resin, and the solvent was discharged after stirring for 10 minutes. 40 ml of an N-methylpyrrolidone solvent was added, cooled to 2.5° C., and stirred for 5 minutes. During waiting, 4.06 grams of iodine was dissolved in 50 ml of an N-methylpyrrolidone solution, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Example 3 (Tetrahydrofuran as a Solvent)

2 mmol of the peptide resin without cyclization of a setmelanotide protective group prepared in Example 1 was suspended in 80 ml of an industrial tetrahydrofuran solvent for soaking the resin, and the solvent was discharged after stirring for 10 minutes. 80 ml of an industrial tetrahydrofuran solvent was added for soaking the resin, and the solvent was discharged after stirring for 10 minutes. 40 ml of an industrial tetrahydrofuran solvent was added, cooled to 2.5° C., and stirred for 5 minutes. During waiting, 4.06 grams of iodine was dissolved in 50 ml of a tetrahydrofuran solution, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Example 4 (Methanol as a Solvent)

2 mmol of the peptide resin without cyclization of a setmelanotide protective group prepared in Example 1 was suspended in 80 ml of an industrial methanol solvent for soaking the resin, and the solvent was discharged after stirring for 10 minutes. 80 ml of an industrial N-methanol solvent was added for soaking the resin, and the solvent was discharged after stirring for 10 minutes. 40 ml of an industrial N-methanol solvent was added, cooled to 2.5° C., and stirred for 5 minutes. During waiting, 4.06 grams of iodine was dissolved in 50 ml of an industrial N-methanol solution, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Example 5 (A Mixture of N-Methylpyrrolidone and Tetrahydrofuran as a Solvent)

2 mmol of the peptide resin without cyclization of a setmelanotide protective group prepared in Example 1 was suspended in a mixed solvent including 20 ml of an N-methylpyrrolidone and 60 ml of an industrial tetrahydrofuran for soaking the resin, and the solvent was discharged after stirring for 10 minutes. A mixed solvent including 20 ml of an N-methylpyrrolidone and 60 ml of an industrial tetrahydrofuran was added for soaking the resin, and the solvent was discharged after stirring for 10 minutes. A mixed solvent including 10 ml of an N-methylpyrrolidone and 30 ml of an industrial tetrahydrofuran was added, cooled to 2.5° C., and stirred for 5 minutes. During waiting, 4.06 grams of iodine was dissolved in a mixed solvent including 12.5 ml of an N-methylpyrrolidone and 37.5 ml of an industrial tetrahydrofuran, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Example 6 (A Mixture of N-Methylpyrrolidone and Tetrahydrofuran as a Solvent)

2 mmol of the peptide resin without cyclization of a setmelanotide protective group prepared in Example 1 was suspended in a mixed solvent including 40 ml of an N-methylpyrrolidone and 40 ml of an industrial tetrahydrofuran for soaking the resin, and the solvent was discharged after stirring for 10 minutes. A mixed solvent including 40 ml of an N-methylpyrrolidone and 40 ml of an industrial tetrahydrofuran was added for soaking the resin, and the solvent was discharged after stirring for 10 minutes. A mixed solvent including 20 ml of an N-methylpyrrolidone and 20 ml of an industrial tetrahydrofuran was added, cooled to 2.5° C., and stirred for 5 minutes. During waiting, 4.06 grams of iodine was dissolved in a mixed solvent including 25 ml of an N-methylpyrrolidone and 25 ml of an industrial tetrahydrofuran, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Example 7 (A Mixture of N-Methylpyrrolidone and Tetrahydrofuran as a Solvent)

2 mmol of the peptide resin without cyclization of a setmelanotide protective group prepared in Example 1 was suspended in a mixed solvent including 60 ml of an N-methylpyrrolidone and 20 ml of an industrial tetrahydrofuran for soaking the resin, and the solvent was discharged after stirring for 10 minutes. A mixed solvent including 60 ml of an N-methylpyrrolidone and 20 ml of an industrial tetrahydrofuran was added for soaking the resin, and the solvent was discharged after stirring for 10 minutes. A mixed solvent including 30 ml of an N-methylpyrrolidone and 10 ml of an industrial tetrahydrofuran was added, cooled to 2.5° C., and stirred for 5 minutes. During waiting, 4.06 grams of iodine was dissolved in a mixed solvent including 37.5 ml of an N-methylpyrrolidone and 12.5 ml of an industrial tetrahydrofuran, and cooled to 0 to 5° C. After the iodine was dissolved, the solution was slowly dropped to the resin solution, a cyclization reaction of a disulfide bond was carried out on the resin at 2.5° C., and after stirring was conducted for 3 hours, a mixed solution was discharged. A mixed solvent including 72 ml of N-methylpyrrolidone and 8 ml of water was added, stirred for 3 minutes, and then discharged. A mixed solution including 72 ml of N-methylpyrrolidone containing 2 grams of vitamin C, and 8 ml of water was added, stirred for 5 minutes, and then discharged. A mixed solution including 72 ml of N-methylpyrrolidone containing 2 grams of vitamin C, and 8 ml of water was added, stirred for 5 minutes, and then discharged. A mixed solvent including 72 ml of N-methylpyrrolidone and 8 ml of water was added, stirred for 3 minutes, and then discharged. A mixed solvent including 72 ml of N-methylpyrrolidone and 8 ml of water was added, stirred for 3 minutes, and then discharged. 80 ml of N-methylpyrrolidone was added, stirred for three minutes, and then discharged. 80 ml of N-methylpyrrolidone was added, stirred for three minutes, and then discharged. 80 ml of N-methylpyrrolidone was added, stirred for three minutes, and then discharged. 80 ml of methylene chloride was added, and the solvent was discharged after stirring for three minutes. 80 ml of methylene chloride was added, and the solvent was discharged after stirring for three minutes. 80 ml of methylene chloride was added, and the solvent was discharged after stirring for three minutes. A remaining substance was subjected to standing before being cut.

Method for Cleavage and Purification of Cyclized Setmelanotide

In the following example 8 to example 13, a method for cleavage and purification of setmelanotide obtained by cyclization of a disulfide bond is provided.

Example 8

The setmelanotide resin prepared in Example 2 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of greater than 85%. The crude setmelanotide solution was purified by HPLC. A section containing a required product was collected, subjected to water removal, and then freeze-dried to obtain pure setmelanotide.

Example 9

The setmelanotide resin prepared in Example 3 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of greater than 80% and the yield was about 20%. The crude setmelanotide solution was purified by HPLC. A section containing a required product was collected, subjected to water removal, and then freeze-dried to obtain pure setmelanotide.

Example 10

The setmelanotide resin prepared in Example 4 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of 64%. The crude setmelanotide solution was purified by HPLC. A section containing a required product was collected, subjected to water removal, and then freeze-dried to obtain pure setmelanotide.

Example 11

The setmelanotide resin prepared in Example 5 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of greater than 80%. The crude setmelanotide solution was purified by HPLC. A section containing a required product was collected, subjected to water removal, and then freeze-dried to obtain pure setmelanotide.

Example 12

The setmelanotide resin prepared in Example 6 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of greater than 85% and the yield was 37-41%. The crude setmelanotide solution was purified by HPLC. A section containing a required product was collected, subjected to water removal, and then freeze-dried to obtain pure setmelanotide.

Example 13

The setmelanotide resin prepared in Example 7 was added to 140 ml of a first cleavage reagent including TFA, TIPS and MC at a volume ratio of 85:7.5:7.5 (the cleavage reagent was used in a volume of 70 ml for 1 mmol of the resin), and stirred at 20° C. for a reaction for 3 hours. A reaction mixture was discharged. The reaction mixture was slowly dropped into a total of 520 ml of isopropyl ether (4 times the volume of the cleavage reagent) for precipitation, and a white solid was obtained by filtration. Then, the white solid was dissolved in 100 ml of a mixed solution including methanol and water at a volume ratio of 10:90 to obtain a crude setmelanotide solution. 70 ml of a second cleavage reagent including TFA, TIPS and MC at a volume ratio of 85:7.5:7.5 (the cleavage reagent was used in a volume of 35 ml for 1 mmol of the resin) was added, and stirred at 20° C. for 3 hours. A reaction mixture was discharged. The reaction mixture was slowly dropped into a total of 280 ml of isopropyl ether (4 times the volume of the cleavage reagent) for precipitation, and a white solid was obtained by filtration. Then, the white solid was dissolved in 50 ml of a mixed solution including methanol and water at a volume ratio of 10:90 to obtain a crude setmelanotide solution. The two crude setmelanotide solutions were combined to obtain a crude product with a purity of 78%. The crude setmelanotide solution was purified by HPLC. A section containing a required product was collected, subjected to water removal, and then freeze-dried to obtain pure setmelanotide. Comparative Example 1-Preparation of setmelanotide by cyclization of a disulfide bond with reference to a same method in Example 4 of a Chinese patent CN111718408

1 mmol of the peptide resin without cyclization of a setmelanotide protective group prepared in Example 1 was added into a cleavage reagent (10 ml/g resin) including TFA, water and EDT at a volume ratio of 90:5:5, and uniformly stirred at room temperature for 3 hours. A filtrate was collected after filtration. The resin was washed for three times with a small amount of TFA, and filtrates were combined, and concentrated under reduced pressure. Anhydrous ether was added for precipitation. After the ethyl ether was removed, a precipitate was dried under reduced pressure, and then dissolved in a 30% acetic acid solution to obtain a 3 mg/ml of solution. An iodine/ethanol saturated solution was dropped under stirring until complete cyclization. An obtained mixed solution was concentrated under reduced pressure at 35-40° C. to obtain crude setmelanotide with a purity of 86.9%.

The yield and purity of solid-phase cyclization of the present disclosure are equivalent to those in Comparative Example 1. However, the solid-phase cyclization reaction concentration of the present invention can reach 11.8 mg/ml, which is only 3 mg/ml in Comparative Example 1. It is indicated that at the same liquid volume, the difference of the production capacity between the two examples is higher than 3 times. Therefore, the solid-phase cyclization method of the present disclosure is obviously conducive to industrial production.

What is claimed is:

1. A preparation method of setmelanotide by cyclization of a disulfide bond in a solid phase, comprising:
   (a) preparation of a peptide resin without cyclization of a setmelanotide protective group:
      using an amino resin as an initial resin, and then sequentially connecting amino acids with a protective group in a reverse direction according to an amino acid sequence of setmelanotide to obtain the peptide resin without cyclization of a setmelanotide protective group;
   (b) cyclization of a disulfide bond of the peptide resin without cyclization of a setmelanotide protective group: putting the peptide resin without cyclization of a setmelanotide protective group in a reaction solvent containing an oxidizing agent, adding a reducing agent to remove the unreacted oxidizing agent, and finally adding a cleavage reagent to obtain a cyclized setmelanotide solution; and
   (c-1) dropping the cyclized setmelanotide solution into an ether for precipitation to obtain crude setmelanotide, or
   (c-2) adding the cyclized setmelanotide solution into a dilution solution to obtain a crude setmelanotide solution.

2. The preparation method according to claim 1, further comprising subjecting the crude setmelanotide or the crude setmelanotide solution to purification and freeze-drying to obtain pure setmelanotide.

3. The preparation method according to claim 1, wherein the peptide resin without cyclization of a setmelanotide protective group is Ac-Arg(Pbf)-Cys(R1)-D-Ala-His(Trt)-D-Phe-Arg(Pbf)-Trp(R2)-Cys(R1)-NH amino resin, R1 is Trt or Acm, and R2 is Boc or H.

4. The preparation method according to claim 2, wherein the amino resin comprises a Rink Amide-MBHA resin, a Rink Amide-BHA resin, a Rink Amide-AM resin, or a Rink Amide resin.

5. The preparation method according to claim 1, wherein the peptide resin without cyclization of a setmelanotide protective group has a substitution value of 0.1 to 0.8 mmol/g.

6. The preparation method according to claim 5, wherein the peptide resin without cyclization of a setmelanotide protective group has a substitution value of 0.15 to 0.62 mmol/g.

7. The preparation method according to claim 1, wherein the reaction solvent comprises nitriles, alcohols, alkanones or cycloethers, and other solvents or mixed solvents.

8. The preparation method according to claim 7, wherein the reaction solvent is a mixed solvent of N-methylpyrrolidone and tetrahydrofuran at a volume ratio of 3:1 to 1:3.

9. The preparation method according to claim 1, wherein the oxidizing agent is iodine.

10. The preparation method according to claim 9, wherein a molar ratio of the use amount of the iodine to the resin is 4 to 12 times.

11. The preparation method according to claim 1, wherein the reducing agent is vitamin C.

12. The preparation method according to claim 10, wherein a molar ratio of the vitamin C to the iodine is 5 to 10 times.

13. The preparation method according to claim 1, wherein the dilution solution comprises water, an alkaline aqueous solution, a mixed solution of water and an alcohol, or a mixed solution of water and acetonitrile.

* * * * *